United States Patent [19]

Persson

[11] Patent Number: 4,901,905

[45] Date of Patent: Feb. 20, 1990

[54] CHARGING SYSTEM IN THE EXPLOSION WELDING OF PLANAR OR CURVED WORKPIECES

[75] Inventor: Ingemar Persson, Nora, Sweden

[73] Assignee: Exploweld AB, Nora, Sweden

[21] Appl. No.: 249,960

[22] Filed: Sep. 27, 1988

[30] Foreign Application Priority Data

Sep. 28, 1987 [SE] Sweden ................................ 8703731

[51] Int. Cl.$^4$ .............................................. B23K 20/08
[52] U.S. Cl. ...................................... 228/107; 228/108
[58] Field of Search .................. 228/107, 2.5, 108, 109

[56] References Cited

U.S. PATENT DOCUMENTS

| | | | |
|---|---|---|---|
| 4,133,471 | 1/1979 | Niwatukino | 228/107 |
| 4,347,965 | 9/1982 | Grossman et al. | 228/107 |
| 4,561,585 | 12/1985 | Persson | 228/2.5 |

Primary Examiner—Nicholas P. Godici
Assistant Examiner—Michael William Starkweather
Attorney, Agent, or Firm—Nies, Webner, Kurz & Bergert

[57] ABSTRACT

A charging system for seam welding two or more workpieces by means of explosion welding, comprising an explosive charge and an inert impulse-transmitting body located between the explosive charge and the workpiece nearest the charge. The invention is characterized in that the surface (11) of the inert body (2) facing the workpiece is so configured in a plane extending at right angles to the longitudinal extension of the ultimate weld seam that the angle α between the surface (11) and the workpiece (3) varies from the center line (C—C) of the inert body (2) perpendicularly to the surface of the workpiece and outwardly from the center line.

7 Claims, 2 Drawing Sheets

CHARGING SYSTEM IN THE EXPLOSION WELDING OF PLANAR OR CURVED WORKPIECES

The present invention relates to an explosive charging system for the seam welding of planar or curved workpieces by explosion welding technique.

It is known to seam weld workpieces by explosion welding, such as so-called lining or jointing. It is also known in this regard to place a plastic body on top of one of the two workpieces to be joined together and to place an explosive charge on top of the plastic body.

In order to ensure that a reliable joint is obtained, it is necessary to adapt the amount of explosive charge used, the configuration of the plastic body, the detonation rate, and the spacing between said workpieces to the material properties and dimensions of the workpieces.

Consequently, difficulties are encountered in practice in obtaining a good bond between the workpieces along the whole of a weld seam. The difficulties encountered increase with increasing material thicknesses of the workpieces.

This drawback is avoided with the charging system of this invention, in that the inventive charging system is so configured that different conditions prevail when explosion welding in a plane extending transversely to the longitudinal direction of the seam ultimately formed.

Thus, the present invention relates to a charging system which is intended for seam welding two or more workpieces by explosion welding, and which includes an explosive charge and an impulse transmitting inert body located between the explosive charge and the workpiece positioned nearest the charge, and is characterized in that the surface of the inert body facing the workpiece is so configured in a plane at right angles to the longitudinal direction of the ultimate weld seam that the angle between said surface and said workpiece will vary from the center line of the inert body perpendicularly to the surface of the workpiece and outwardly from said center line.

The invention will now be described with reference to a number of exemplifying embodiments thereof illustrated in the accompanying drawings, which also illustrate three examples of the known technique.

Figure 1A:
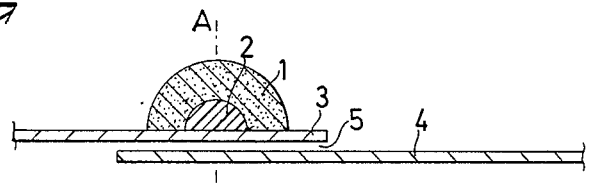
FIGS. 1a–1c illustrate examples of known technique.

In all figures the reference 1 identifies an explosive charge and the reference 2 an impulse transmitting body comprised of a material which is inert to detonation. In FIGS. 1, 2, 3 and 6, the reference 3 and the reference 4 identify the workpieces that are to be joined together. The reference 5 illustrates a gap between the workpieces, this gap constituting the acceleration distance between the workpieces.

All figures are cross-sectional views of a charging system. The longitudinal extension of the welding seam ultimately formed is therefore perpendicular to the plane of the paper. The inert body 2 may comprise any suitable material whatsoever. Preferably, however, it is made from a plastics or rubber material.

The explosive used may also be of any suitable kind whatsoever, e.g. PETN, HMX, ammonium-nitrate oil, etc.

Figure 1B:
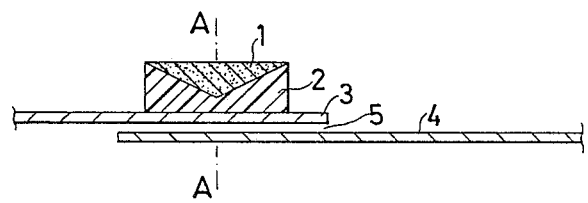
Figure 1C:
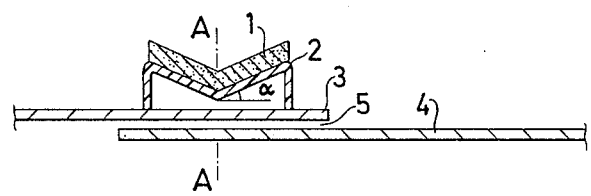

FIGS. 1a–1c exemplify known charging systems. As will be seen from these illustrations, the angle between the body 2 and the one workpiece 3 is constant along the width of the ultimate seam in all three different cases.

When detonation takes place, the plastic body of the FIG. 1c illustration is moved straight downwards in the figure, i.e. the angled surfaces of the body will come into successive abutment with the workpiece 3 at a constant angle $\alpha$.

Because, when practising the known technique, the conditions which prevail from a center line A—A and outwards in both directions are the same, it is necessary to adapt the quantity of charge used, the detonation rate and the distance 5 between the workpieces relatively accurately, in order to obtain a reliable weld seam.

Figure 2:
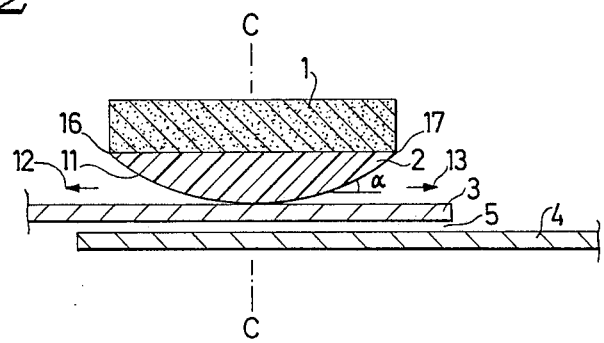
FIG. 2 illustrates a first embodiment of an inventive charging system.
Figure 3:
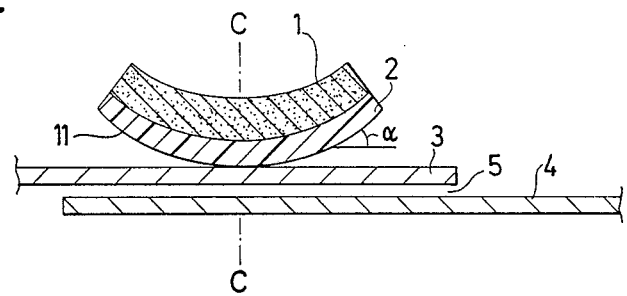
FIG. 3 illustrates a second embodiment of an inventive charging system.

The charging system according to the invention can, in principle, have the form illustrated in FIG. 2 or FIG. 3. One characteristic of these two configurations is that the surface 11 of the inert body 2 facing the workpiece at right angles to the longitudinal extension of the ultimate weld seam is so formed that the angle $\alpha$ between said surface and said workpiece varies from the center line C—C of the body, at right angles to the surface of the workpiece in an outward direction from said center line.

According to one preferred embodiment of the invention the surface 11 is of circular-arcuate shape. Other configurations can be used, however, such as shapes which can be described as being oval or which can be represented by polynomial functions of high orders.

In the case of the FIG. 2 embodiment, the inert body 2 has a planar upper surface and the charge 1 has a rectangular cross-section.

In the case of the FIG. 3 embodiment, the inert body 2 and the charge 1 both have constant thickness and are both curved so as to be outwardly concave.

When the explosive substance 1 is detonated, the material in the body 2 is accelerated downwards against the workpiece 3, thereby imparting to the workpiece 3 a downward movement impulse which brings said workpiece into collision with the underlying workpiece 4.

The whole sequence of events takes place successively from the center line C—C of said cross-section and outwardly in the direction of the arrows 12, 13. The speed of the collision front and the collision angle between between the workpieces 3 and 4 are contingent on the angle $\alpha$ between the body 2 and the workpiece 3.

As before mentioned, according to this invention the surface of the body 2 facing the workpiece is curved, and hence the angle varies from 0° and upwards.

Within this angular range, preferably from 0° and up to 60°, there is constantly found a small angular range which creates conditions for a reliable weld under the local prevailing conditions relating to material properties of the workpieces, dimensions, acceleration distance, surface fineness, etc.

If the conditions concerning material properties, dimensions, acceleration distance, etc. are such that a given angular range with regard to the angle α is required in order to obtain a good seam weld, a seam will thus be formed in a region between the workpieces 3, 4 which is located beneath that part of the body where said angular range for the angle α is found. Thus, the region or area in which welding takes place may embrace a larger or smaller part of the area extending from the center line C—C and outwards to the edges 16, 17 of the body 2.

However, it is not essential that all or the major part of the part of the workpieces located beneathed the body are welded together, but that a weld is obtained over a part of this area. Thus, if the aforesaid conditions change along the longitudinal extension of the ultimate weld seam, the area or region in which welding takes place will be located at mutually different distances from the center line in different sections along the length of the seam weld.

Thus, if a sufficient charging impulse is produced, which impulse can be controlled in a known manner by varying the quantity and type of explosive substance used, a reliable weld will always be obtained when proceeding in accordance with the present invention.

Figure 4:
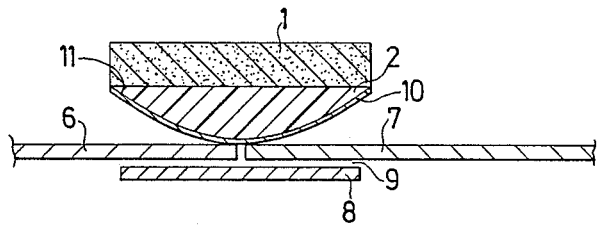
FIG. 4 illustrates the embodiment of FIG. 1 applied with three workpieces.
Figure 6:
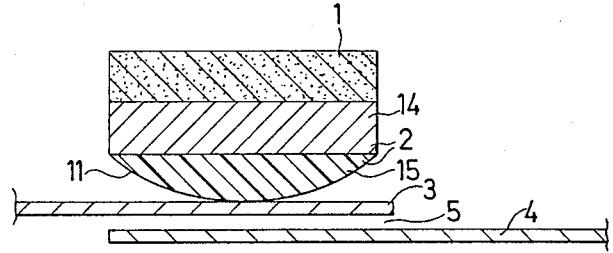
FIG. 6 illustrates a third embodiment of an inventive charging system.

In the case of the illustrated embodiments of FIGS. 2 and 3, the body 2 is in contact with the workpiece 3. The one workpiece, however, can also be spaced from the other workpiece, as illustrated in FIGS. 4 and 6. In this case, the acceleration distance between the body 2 and the workpiece 3 has been increased, and hence the impact rate is higher. Consequently, the shock wave imparted to the workpiece 3 will have a higher amplitude. This decreases the impulse time, however, although this decrease lacks significance in the case of thin or slender workpieces. As will be understood, as with other applications of the explosion welding technique, it is possible to weld together simultaneously more than two workpieces arranged in superposed relationship.

Figure 5:
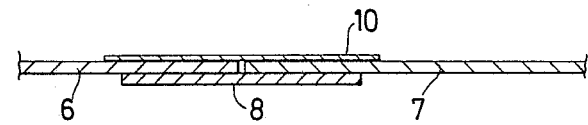
FIG. 5 illustrates the result obtained when welding with a charging system according to FIG. 4.

FIG. 4 illustrates an inventive charging system which is intended for joining two workpieces 6 and 7 located in mutually the same plane to a third workpiece 8. In such welding procedures, the workpieces 6 and 7 will often be positioned with their opposing edges close together, as shown in FIG. 4. In order to avoid crevice corrosion in the gap between the workpieces 6, 7 in the case of certain applications, the gap can be bridged by means of a strip of material 10 attached to the curved surface of the inert body 2. The metal strip 10 is made of metal. Subsequent to detonation, the weld seam will thus have the configuration illustrated in FIG. 5.

FIG. 6 illustrates another preferred emobodiment of the invention, in which the inert body 2 comprises a heavier part 14, preferably a metal part, and a lighter part 15, preferably made of a plastic or rubber material.

The purpose of this embodiment is to extend the impulse imparted to the workpiece 3, by increasing the mass of the body, which has been found beneficial in the case of thick workpieces, particularly in the case of workpieces having a thickness geeater than about 3 mm.

The shape or form of the workpieces has not been mentioned in the aforegoing. The present invention can be applied both with planar workpieces and with curved workpieces, such as pipes or tubes. In this latter case, the figures thus illustrate an axial section through the pipe walls to be seam welded in the peripheral direction of the pipes.

It is clearly apparent from the aforegoing that the present invention results in a reliable weld.

It is also obvious that the inert body may have other configurations than those illustrated in the figures. For example, the body may include an angular range with regard to the angle α from 0° and up to 90°.

Consequently, the aforedescribed and illustrated embodiments are not restrictive of the invention, but can be modified within the scope of the following claims.

I claim:

1. A charging system for seam welding two or more workpieces by means of explosion welding, comprising an explosive charge and an inert impulse-transmitting body located between the explosive charge and the surface of the one of said workpieces nearest said charge, wherein the surface of the inert body facing the said surface of said one workpiece is so configured in a plane at right angles to the longitudinal extension of the ultimate welding seam that the angle α between said surface of the inert body and the adjacent surface of the one workpiece varies from the center line of the inert body perpendicularly to the said surface of the one workpiece and outwards from said center line, and wherein said charge has a constant thickness and is located on top of the inert body and the charge extends across the whole width of the inert body.

2. A system according to claim 1, wherein said angle α extends on each side of said center line through an angular range of from 0° at said center line up to an angle of about 90°.

3. A system according to claim 1, wherein said surface (11) of the inert body (2) is defined by a circular arc in a plane which extends perpendicularly to the longitudinal extension of the ultimate weld seam.

4. A system according to claim 1, wherein the inert body (2) is made of a plastic or rubber material.

5. A system according to claim 1, wherein the inert body (2) is comprised of a metal part (14) and a part (15) made of a plastic or a rubber material.

6. A system according to claim 1, wherein the angle α extends on each side of said center line through a range of from 0° at said center line up to an angle of approximately 60°.

7. A charging system for seam welding two or more workpieces by means of explosion welding, comprising an explosive charge and an inert impulse-transmitting body located between the explosive charge and the surface of the one workpiece nearest said charge, wherein the surface of the inert body facing the said surface of the one workpiece is so configured in a plane at right angles to the longitudinal extension of the ultimate welding seam that the angle α between said surface of the inert body and the said adjacent surface of the adjacent one workpiece varies from the center line of the inert body perpendicularly to said surface of the workpiece and outwards from said center line, and wherein said inert body is comprised of a metal part and a part made of a plastic or a rubber material.

* * * * *